US012663380B2

(12) United States Patent
Shin et al.

(10) Patent No.: US 12,663,380 B2
(45) Date of Patent: Jun. 23, 2026

(54) MARKING SYSTEM AND MARKING METHOD FOR IDENTIFYING DEFECT OF ELECTRODE SHEET

(71) Applicant: LG Energy Solution, Ltd., Seoul (KR)

(72) Inventors: Dong Hyeok Shin, Daejeon (KR); Sang Hoon Choy, Daejeon (KR); Jeong Soo Seol, Daejeon (KR); In Sang Cho, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 390 days.

(21) Appl. No.: 18/276,503

(22) PCT Filed: Apr. 7, 2022

(86) PCT No.: PCT/KR2022/005054
§ 371 (c)(1),
(2) Date: Aug. 9, 2023

(87) PCT Pub. No.: WO2022/225232
PCT Pub. Date: Oct. 27, 2022

(65) Prior Publication Data
US 2024/0264089 A1      Aug. 8, 2024

(30) Foreign Application Priority Data

Apr. 23, 2021     (KR) ........................ 10-2021-0053336

(51) Int. Cl.
*H01M 4/04*          (2006.01)
*G01N 21/88*         (2006.01)
*G01N 21/89*         (2006.01)

(52) U.S. Cl.
CPC .......... *G01N 21/8914* (2013.01); *H01M 4/04* (2013.01); *G01N 2021/888* (2013.01)

(58) Field of Classification Search
CPC ......... G01N 21/8914; G01N 2021/888; G01N 2021/8427; G01N 21/892; G01N 21/91;
(Continued)

(56) References Cited

U.S. PATENT DOCUMENTS

| | | | | |
|---|---|---|---|---|
| 5,673,028 A | * | 9/1997 | Levy ..................... | G06F 11/326 |
| | | | | 324/555 |
| 8,926,387 B2 | * | 1/2015 | Nara ................ | G01N 21/95607 |
| | | | | 445/24 |

(Continued)

FOREIGN PATENT DOCUMENTS

| | | |
|---|---|---|
| CH | 639771 A5 | 11/1983 |
| CN | 102680485 A | 9/2012 |

(Continued)

OTHER PUBLICATIONS

Extended European Search Report including Written Opinion for Application No. 22791932.1 dated Sep. 25, 2024. 8 pgs.
(Continued)

*Primary Examiner* — Giovanni Astacio-Oquendo
*Assistant Examiner* — Trung Q Nguyen
(74) *Attorney, Agent, or Firm* — Lerner David LLP

(57) ABSTRACT

A marking system is provided for identifying defects of an electrode sheet that includes an active material layer coated with an electrode active material and a non-coating portion disposed at one side in a width direction of the active material layer. The marking system for identifying the defects of the electrode sheet may include: a vision sensor configured to detect the defects of the electrode sheet; a heater disposed behind the vision sensor in a moving direction of the electrode sheet, the heater being configured to heat the non-coating portion when the defects are detected by the vision sensor; a marker configured to mark ink on an area corresponding to each defect on the non-coating portion (Continued)

heated by the heater; and a blower disposed behind the marker in the moving direction of the electrode sheet to dry the ink on the area.

13 Claims, 6 Drawing Sheets

(58) Field of Classification Search
CPC ........ G01N 21/8851; G01N 2021/786; H01M 4/04; H01M 4/0404; H01M 4/139; Y02E 60/10
USPC .............................. 324/500, 600, 76.11, 660
See application file for complete search history.

(56) References Cited

U.S. PATENT DOCUMENTS

| | | | | |
|---|---|---|---|---|
| 11,211,639 | B2 * | 12/2021 | Busacca | ............ H01M 10/0525 |
| 12,422,895 | B2 * | 9/2025 | An | ......................... G06F 1/1616 |
| 2002/0154308 | A1 | 10/2002 | Uesugi et al. | |
| 2006/0164647 | A1 | 7/2006 | Shibata | |
| 2007/0052964 | A1 | 3/2007 | Uesugi et al. | |
| 2009/0086209 | A1 | 4/2009 | Uesugi et al. | |
| 2017/0341361 | A1 | 11/2017 | Lee et al. | |
| 2019/0292392 | A1 | 9/2019 | Okuda et al. | |
| 2020/0119333 | A1 | 4/2020 | Masuzawa et al. | |
| 2020/0326287 | A1 * | 10/2020 | Ferdous | ................. G01N 27/84 |
| 2023/0019231 | A1 * | 1/2023 | Rust, III | ............. H01M 4/0404 |
| 2023/0068999 | A1 * | 3/2023 | Ueda | .................. G01N 21/8914 |
| 2023/0349834 | A1 * | 11/2023 | Choi | ................. H01M 10/4285 |

FOREIGN PATENT DOCUMENTS

| | | | |
|---|---|---|---|
| CN | 106696503 | A | 5/2017 |
| CN | 208679849 | U | 4/2019 |
| CN | 110116566 | A | 8/2019 |
| CN | 110294968 | A | 10/2019 |
| CN | 110383538 | A | 10/2019 |
| JP | H10176998 | A | 6/1998 |
| JP | 2001347315 | A | 12/2001 |
| JP | 2002076069 | A | 3/2002 |
| JP | 4792765 | B2 | 10/2011 |
| JP | 2013036768 | A | 2/2013 |
| JP | 2015002149 | A | 1/2015 |
| JP | 2015035360 | A | 2/2015 |
| JP | 5925609 | B2 | 5/2016 |
| JP | 6103220 | B2 | 3/2017 |
| JP | 2019061943 | A | 4/2019 |
| KR | 120010055922 | A | 7/2001 |
| KR | 20060027260 | A | 3/2006 |
| KR | 100568973 | B1 | 4/2006 |
| KR | 20060034127 | A | 4/2006 |
| KR | 100601567 | B1 | 7/2006 |
| KR | 100601568 | B1 | 7/2006 |
| KR | 20060082802 | A | 7/2006 |
| KR | 100824808 | B1 | 4/2008 |
| KR | 101106335 | B1 | 1/2012 |
| KR | 101182956 | B1 | 9/2012 |
| KR | 101222218 | B1 | 1/2013 |
| KR | 20130012384 | A | 2/2013 |
| KR | 101275815 | B1 | 6/2013 |
| KR | 101674353 | B1 | 11/2016 |
| KR | 101690312 | B1 | 1/2017 |
| KR | 20170066046 | A | 6/2017 |
| KR | 20180010732 | A | 1/2018 |
| KR | 20190113912 | A | 10/2019 |

OTHER PUBLICATIONS

Search Report dated Feb. 25, 2026 from the Office Action for Chinese Application No. 202280014923.5 issued Feb. 27, 2023, 4 pages.
International Search Report PCT/KR2022/005054 mailed Jul. 21, 2022. 3 pages.

* cited by examiner

MARKING SYSTEM AND MARKING METHOD FOR IDENTIFYING DEFECT OF ELECTRODE SHEET

CROSS-REFERENCE TO RELATED APPLICATION

The present application is a national phase entry under 35 U.S.C. § 371 of International Application No. PCT/KR2022/005054 filed Apr. 7, 2022, which claims priority from Korean Patent Application No. 10-2021-0053336, filed on Apr. 23, 2021, all of which are incorporated herein by reference.

TECHNICAL FIELD

The present invention relates to a marking system and marking method for identifying defects of an electrode sheet.

BACKGROUND ART

In general, secondary batteries include nickel-cadmium batteries, nickel-hydrogen batteries, lithium ion batteries, and lithium ion polymer batteries. Such a secondary battery is being applied to be used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture such a secondary battery, first, electrode active material slurry (hereinafter, referred to as an 'electrode active material') is applied to an electrode collector and a negative electrode collector to manufacture an electrode sheet, and an electrode sheet is cut to a predetermined size and laminated on both sides of a separator to form an electrode stack having a predetermined shape. Also, the electrode stack is accommodated in a battery case, and then the battery case is sealed after an electrolyte is injected therein.

The electrode stack may include various types such as a simple stack type, a lamination & stack type (L&S), a stack & folding type (S&F), a Z-folding type, and the like.

In case of a negative electrode, copper, which is a carbon material, is mainly used for the electrode collector, and in case of a positive electrode, aluminum, which is a lithium-based oxide, is mainly used for the electrode collector. The electrode active material is formed by mixing a solvent, a plasticizer, an electrode active material, a binder, and the like.

In addition, poly vinylidene fluoride (PVDF) and stylene butadiene rubber (SBR) may be used as the binder, and acetone or N-methylproidone (NMP) may be used as the solvent.

In general, the electrode collector is horizontally unwound in a state of being wound in a roll shape on a unwinder and passes through a lower portion of a coating device for applying the electrode active material. In this case, the coating device continuously applies the electrode active material to the electrode collector to a constant thickness. In addition, a width at which the coating device applies the electrode active material may be less than a width of the electrode collector. Thus, a non-coating portion to which the electrode active material is not applied is formed on one side or both sides of the electrode collector in a width direction.

Thereafter, the electrode collector may pass through a dryer. Since the electrode active material slurry is in a fluidized state containing a large amount of solvent, the solvent is volatilized by the dryer, and the electrode active material slurry is attached to the electrode collector with considerable strength by the binder. Thus, the electrode active material may be applied on the electrode collector to form an active material layer.

However, in the process of applying the electrode active material to the electrode collector, foreign substances may be applied together with the electrode active material and thus contaminated, and defects such as pinholes or streaks may occur in the coating layer due to causes such as generation of bubbles while the electrode active material is applied. In this case, if the defects remain in the electrode stack, there is a problem in that the defects of the battery occur.

DISCLOSURE OF THE INVENTION

Technical Problem

An object of the present invention for solving the above problem is to provide a marking system and marking method that are capable of easily identifying positions and sizes of defects of an electrode sheet.

Another object of the present invention for solving the above problem is to provide a marking system and marking method that are capable of improving a drying speed of ink.

Technical Solution

A marking system for identifying defects of an electrode sheet according to an embodiment of the present invention performs marking for identifying an electrode sheet including an active material layer coated with an electrode active material and a non-coating portion disposed at one side in a width direction of the active material layer. The marking system for identifying the defects of the electrode sheet may include: a vision sensor configured to detect the defects of the electrode sheet; a heater disposed behind the vision sensor in a moving direction of the electrode sheet, the heater being configured to heat the non-coating portion when the defects are detected by the vision sensor; a marker configured to mark ink on an area corresponding to each of the defect on the non-coating portion heated by the heater; and a blower disposed behind the marker in the moving direction of the electrode sheet to dry the ink on the area.

The marking system may further include at least one guide roll that is in contact with the electrode sheet to guide movement of the electrode sheet. The guide roll may not be disposed between the marker and the blower in the moving direction of the electrode sheet.

The heater may be disposed in front of the marker in the moving direction of the electrode sheet or disposed to face the marker with the non-coating portion therebetween.

The marker and the heater may be disposed to face the same surface of the non-coating portion.

The heater may include a heating source or hot air injection device that is not in contact with the non-coating portion.

The marking system may further include a controller configured to control the heater and/or the blower based on at least one of a moving speed of the electrode sheet or a length of the area.

A marking method for identifying defects of an electrode sheet may include: a detecting process of detecting defects of an electrode sheet through a vision sensor; a heating process of heating the non-coating portion through a heater when the defects are detected; a marking process of marking ink through a marker on an area corresponding to each of the defect on the heated non-coating portion; and a drying process of injecting air to the area through a blower to dry the ink.

The area may have a predetermined minimum length.

In the heating process, a temperature of the heater may be proportional to a moving speed of the electrode sheet, and an operation time of the heater may be proportional to a length of the area.

In the drying process, an output of the blower may be proportional to a moving speed of the electrode sheet, and an operation time of the blower may be proportional to a length of the area.

In the marking process, the ink may be marked discontinuously on the area.

The heater may heat the non-coating portion at a temperature of 30 degrees to 100 degrees Celsius.

Advantageous Effects

According to the preferred embodiment of the present invention, the marker may perform the marking with the ink on the area on the non-coating portion, which corresponds to each of the defects of the active material layer. As a result, the positions and sizes of the defects of the electrode sheet may be easily identified in the future process, and the portion of the electrode sheet having the defects may be discarded or collected before being applied to the assembling of the electrode assembly. Therefore, the quality of the manufactured battery may be improved.

In addition, since the marker performs the marking with the ink, the defects having the various sizes may be easily identified compared to the labeling method and the like.

In addition, the heater may previously heat the non-coating portion before marking the ink on the non-coating portion by using the marker, and after the marker marks the ink, the blower may inject the air toward the ink to dry the ink. Therefore, the ink may be dried quickly.

In addition, since the guide roll is not disposed between the marker and the blower, it is possible to prevent the ink from being transferred to the guide roll before being dried so as not to be erased.

In addition, when the marker and the heater face the same surface of the non-coating portion, there may be the advantage in that the surface on which the ink is marked is more directly heated.

Also, when the marker and the heater face each other with the non-coating portion therebetween, the space required to install the marker and the heater may be reduced. Therefore, there may be the advantage that the marking system is installed even for the existing equipment having the narrow distance between the guide rolls.

In addition, the heater and/or blower may be controlled based on at least one of the moving speed of the electrode sheet or the length of the area on which the ink is marked. Therefore, the energy efficiency of the marking system may be improved, and the drying of the ink may be performed reliably.

In addition, the area on which the ink is marked may have the predetermined minimum length. Therefore, the ink marked on the area may be easily identified in the future, and the entire area may be cut while a portion of the non-coating portion is processed to form the tab, thereby preventing the ink from being unidentifiable.

In addition, the ink may be marked discontinuously. Therefore, when compared to the case in which the ink is continuously marked to elongated, the ink may be marked quickly in response to the fast moving non-coating portion, and also, the drying speed of the ink may be further improved.

In addition, the heater may heat the non-coating portion to 30 degrees to 100 degrees Celsius. Therefore, the tensile strength of the non-coating portion may be prevented from being excessively lowered even while the drying of the ink is promoted.

MODE FOR CARRYING OUT THE INVENTION

Figure 1:
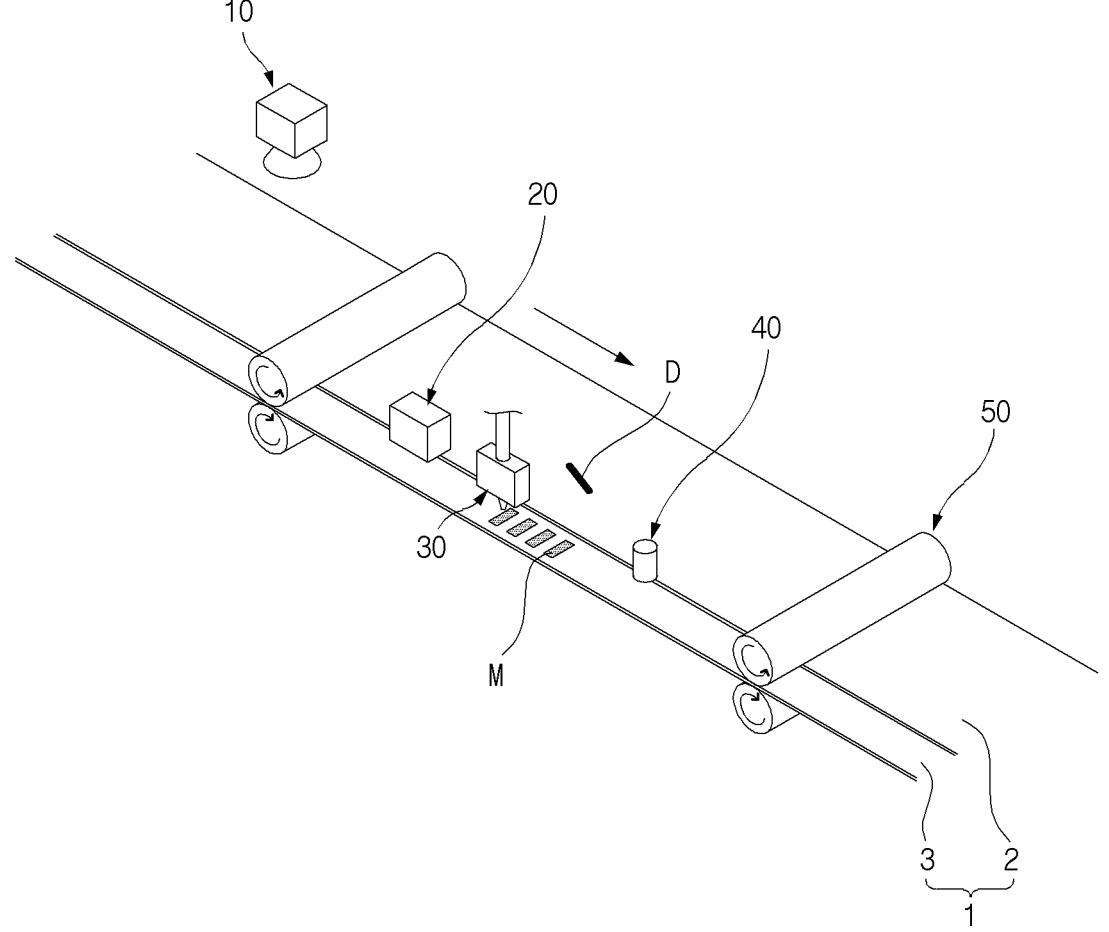
FIG. 1 is a perspective view illustrating a marking system for identifying defects of an electrode sheet according to an embodiment of the present invention.

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known may technologies that unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

FIG. 1 is a perspective view illustrating a marking system for identifying defects of an electrode sheet according to an embodiment of the present invention.

The marking system for identifying defects of an electrode sheet (hereinafter, referred to as a 'marking system') may perform marking to detect defects D of an electrode sheet 1 and easily identify the defects D.

The electrode sheet 1 may be formed by applying an electrode collector with an electrode active material. In more detail, the electrode sheet 1 may include an active material layer 2 coated with the electrode active material and an non-coating portion 3 disposed at one side of the active material layer 2 in a width direction. The non-coating portion 3 may be a portion of the electrode collector, to which the electrode active material is not applied, and may be processed into an electrode tab in a future process.

The electrode sheet 1 may move in a horizontally unfolded state by a moving mechanism (not shown). A moving speed of the electrode sheet 1 may be constant or variable under specific conditions. The moving mechanism for moving the electrode sheet 1 may include an unwinder and a rewinder, which are well-known techniques, and thus detailed descriptions thereof will be omitted.

The electrode sheet 1, particularly the active material layer 2 may be contaminated because of containing foreign substances, or the defects D occurring due to a pinhole or a streak may occur. The marking system may detect the defects D and perform marking on an area A (see FIG. 3*a*) corresponding to each of the defects D on the non-coating portion 3 with ink. Therefore, if the defects D exist in the electrode sheet 1, a mark M may be formed on the area A corresponding to each of the defects D on the non-coating portion 3 of the electrode sheet 1 passing through the marking system.

In addition, the portion of the electrode sheet 1 on which the mark M is formed may be discarded or collected in the future process. In more detail, a cutter (not shown) may cut the electrode sheet 1 at regular intervals to form unit electrodes. In this case, a mark detection sensor (not shown) may detect a defective unit electrode on which the mark M is formed, and the defective unit electrode may be discarded or collected before being applied to the assembling of the electrode assembly. For example, the mark detection sensor may detect the mark M according to an amount of light reflected by a light amount reflection method or detect the mark M by an RGB color method.

However, the mark detection sensor may also detect the mark M formed on the electrode sheet 1 instead of the unit electrode.

In more detail, the marking system may include a vision sensor 10, a heater 20, a marker 30, and a blower 40.

In this embodiment, the vision sensor 10, the heater 20, the marker 30, and the blower 40 may be sequentially disposed with respect to a moving direction of the electrode sheet 1.

The vision sensor 10 may detect the defects D of the electrode sheet 1, more specifically, the active material layer 2. The vision sensor 10 may be disposed toward the active material layer 2 and may detect the defects D in a state of being in contact with the active material layer 2. For example, the vision sensor 10 may include a camera that acquires image information.

The heater 20 may be disposed after the vision sensor 10 with respect to the moving direction of the electrode sheet 1.

The heater 20 may previously heat the non-coating portion 3 before marking the ink on the non-coating portion 3 by using the marker 30, which will be described later. Thus, the ink marked by the marker 30 may be dried quickly.

The heater 20 may be disposed toward the non-coating portion 3. In more detail, the heater 20 and the marker 30 may be disposed to face the same surface of the non-coating portion 3. That is, the heater 20 may more efficiently heat the surface on which the ink is marked.

However, the present invention is not limited thereto, and the heater 20 may be configured to heat not only the non-coating portion 3 but also the active material layer 2.

The heater 20 may heat the non-coating portion 3 in a non-contact manner. For example, the heater 20 may include at least one of a heat source such as an infrared lamp or an LED lamp, or a hot air injection device for injecting hot air.

The heater 20 is normally maintained in an off state and then is turned on when the defects D are detected by the vision sensor 10 to heat the non-coating portion 3. That is, since the heater 20 does not operate unnecessarily, energy efficiency of the marking system may be improved.

The heater 20 may heat the non-coating portion 3 to a temperature at which the ink is dried quickly without excessively lowering tensile strength of the non-coating portion 3. In more detail, the heater 20 may heat the non-coating portion 3 to 30 degrees to 100 degrees Celsius. This is because, when the temperature of the non-coating portion 3 is less than 30 degrees Celsius, the drying effect of the ink is insignificant, and when the temperature of the non-coating portion 3 is greater than 100 degrees Celsius, the tension of the non-coating portion 3 made of copper or aluminum material is deteriorated to cause deformation.

In addition, the heating temperature of the heater 20 may vary according to the moving speed of the electrode sheet 1. In more detail, as the moving speed of the electrode sheet 1 increases, the heating temperature of the heater 20 may increase. Thus, even though the electrode sheet 1 moves rapidly, the non-coating portion 3 may be sufficiently heated at a high temperature.

In addition, an operating time of the heater 20 may vary according to a length LD (see FIG. 3*a*) of the defect D with respect to the moving direction of the electrode sheet 1. In more detail, the longer the length LD of the defect D with respect to the moving direction of the electrode sheet 1, the longer the operation time of the heater 20. Thus, the heater 20 may sufficiently heat a long area on the non-coating portion 3.

The marker 30 may be disposed behind the heater 20 with respect to the moving direction of the electrode sheet 1.

The marker 30 may inject ink onto the non-coating portion 3 in an inkjet manner to perform the marking. In addition, it is preferable that the ink used in the inkjet manner is volatile ink capable of being dried in a short time. In addition, UV ink that is dried quickly by causing a photochemical reaction with ultraviolet energy without containing a volatile organic solvent may also be used. However, an operation method of the marker 30 and a type of ink are not limited thereto and thus may vary as necessary.

The marker 30 may be disposed toward the non-coating portion 3, and the mark M may be formed by marking the ink on the area A (see FIG. 3*a*) corresponding to each of the defects D on the non-coating portion 3. The area A will be described in detail later.

If the marker 30 marks the ink on the active material layer 2, the ink is absorbed into the active material layer 2, and thus, there is a fear that the mark M is not identified thereafter. That is, since the ink is marked on the non-coating portion 3, there is an advantage in that the mark M is improved in visibility.

Also, as described above, the marker 30 may mark the ink on the non-coating portion 3 heated by the heater 20. Thus, the ink marked on the heated non-coating portion 3 may be dried quickly.

In addition, the marker 30 may discontinuously mark the ink on the non-coating portion 3. That is, the plurality of marks M formed on the non-coating portion 3 by the marker 30 may be formed at regular intervals in a longitudinal direction of the electrode sheet 1. Thus, when compared to the case in which the mark M is continuously formed to be elongated, the ink may be marked quickly in response to the fast moving non-coating portion 3, and also, the drying speed of the ink may be further improved.

The blower 40 may be disposed behind the marker 30 with respect to the moving direction of the electrode sheet 1.

The blower 40 may be disposed toward the non-coating portion 3 and may inject air toward the non-coating portion 3. Preferably, the blower 40 may inject hot air toward the non-coating portion 3. Thus, the ink marked on the non-coating portion 3, that is, the mark M may be dried more quickly.

However, the present invention is not limited thereto, and the blower 40 may be configured to dry not only the non-coating portion 3 but also the active material layer 2.

Like the heater 20, the blower 40 may also be normally maintained in the off state, and when the defects D are detected by the sensor 10, or the marker 30 marks the ink on the non-coating portion 30, the blower 40 may also be turned on to dry the non-coating portion 3. That is, since the blower 40 does not operate unnecessarily, energy efficiency of the marking system may be improved.

In addition, a rotation speed of a fan included in the blower 40 may vary according to the moving speed of the electrode sheet 1. In more detail, the faster the moving speed of the electrode sheet 1, the faster the fan included in the blower 40 rotates, and thus, the blower 40 may inject air more strongly. Thus, even if the electrode sheet 1 moves rapidly, the blower 40 is capable of rapidly drying the mark M.

In addition, the operation time of the blower 40 may vary according to the length LA of the area A marked with the ink on the non-coating portion 3. In more detail, as the length LA of the area A increases, the operation time of the blower 40 may increase. Thus, the blower 40 may sufficiently dry the long area on the non-coating portion 3.

The marking system may further include at least one guide roll 50 that is in contact with the electrode sheet 1 to guide the movement of the electrode sheet 1.

The guide roll 50 may include a pair of rollers that are in contact with both surfaces of the electrode sheet 1 with the electrode sheet 1 therebetween, and the electrode sheet 1 may move while being maintained in tension by the guide roll 50.

However, if the ink marked on the non-coating portion 3 by the marker 30 passes through the guide roll 50 before the drying, a guide roll transfer phenomenon in which the guide roll 50 is contaminated by the ink may occur, and the mark M formed on the non-coating portion 3 may be erased. Therefore, it is important to dry the mark M before reaching the guide roll 50.

For this, the guide roll 50 may not be disposed between the marker 30 and the blower 40 in the moving direction of the electrode sheet 1. That is, one guide roll 50 may be disposed behind the blower 40 with respect to the moving direction of the electrode sheet 1.

In addition, if the tensile strength of the non-coating portion 3 heated by the heater 20 decreases, deformation may occur in the non-coating portion 3 while passing through the guide roll 50. Thus, it is preferable that the guide roll 50 is also not disposed between the heater 20 and the marker 30. That is, the other guide roll 50 may be disposed in front of the heater 20 in the moving direction of the electrode sheet 1.

Figure 2:
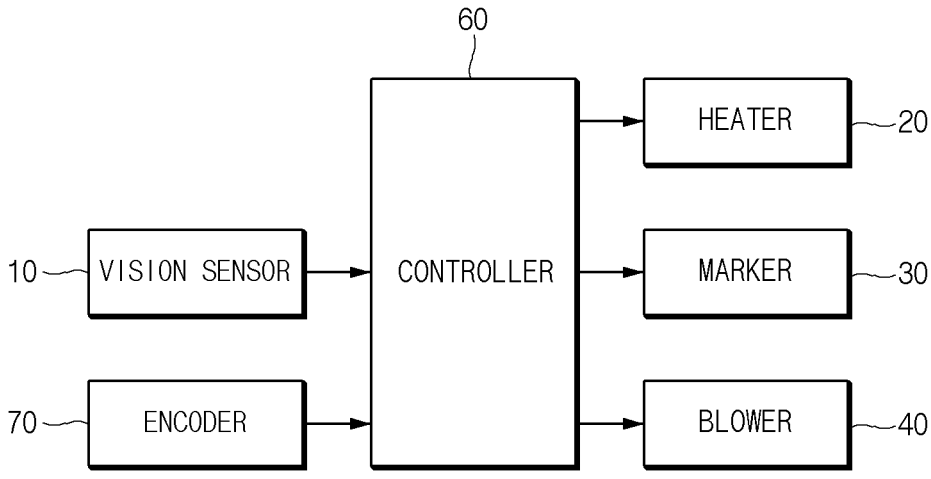
FIG. 2 is a control block flow diagram illustrating the marking system for identifying the defects of the electrode sheet according to an embodiment of the present invention.

FIG. 2 is a control block flow diagram illustrating the marking system for identifying the defects of the electrode sheet according to an embodiment of the present invention.

The marking system may further include a controller 60.

The controller 60 may include at least one processor. The controller 60 may receive the image information acquired from the vision sensor 10 to determine whether the defects D occur, and if the defects D occur, the heater 20, the marker 30 and the blower 40 may operate.

The controller 60 may communicate with the vision sensor 10 to receive the positions and sizes of the defects D on the active material layer 2 and determine a position and length of the area A (see FIG. 3a) on which the ink has to be marked on the non-coating portion 3 based on the received information.

The controller 60 may adjust the heating temperature and operation time of the heater 20. In more detail, the controller 60 may allow the temperature of the heater 20 to increase in proportion to the moving speed of the electrode sheet 1. The controller 60 may communicate with an encoder 70 provided in the moving mechanism for moving the electrode sheet 1 to calculate the moving speed of the electrode sheet 1. In addition, the controller 60 may operate the heater 20 for a longer period as the length of the area A increases.

The controller 60 may control the marker 30 to mark the ink on the area A. The controller 60 may control an ink injection speed of the marker 30 in response to the moving speed of the electrode sheet 1.

The controller 60 may adjust the rotation speed and operation time of the blower 40. In more detail, the controller 60 may allow the rotation speed of the fan included in the blower 40 to increase in proportion to the moving speed of the electrode sheet 1, and as the length of the area A increases, the blower 40 may operate for a long time.

Figure 3A:
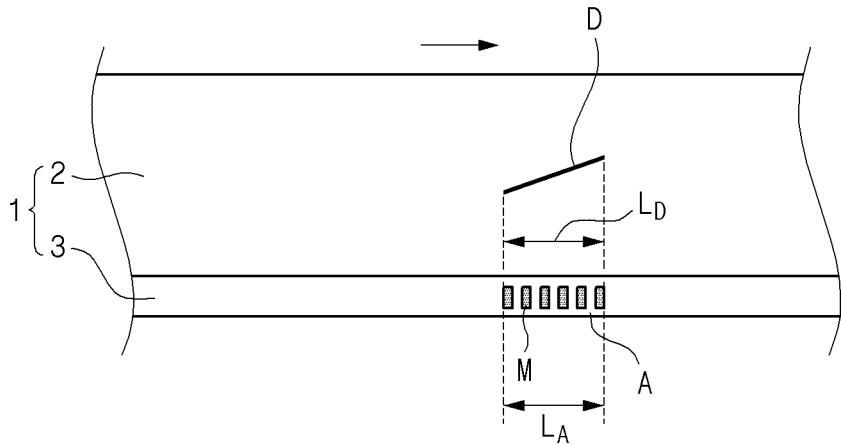
FIGS. 3a and 3b are views for explaining an operation of the marking system for identifying the defects of the electrode sheet according to an embodiment of the present invention.
Figure 3B:
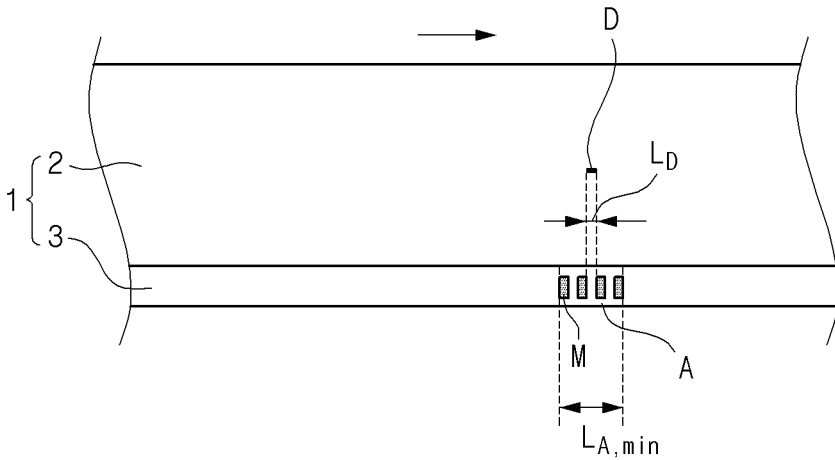

FIGS. 3a and 3b are views for explaining an operation of the marking system for identifying the defects of the electrode sheet according to an embodiment of the present invention.

As described above, when the defects D are detected on the active material layer 2, the marker 30 may mark the ink on the area A corresponding to each of the defects D on the non-coating portion 3. In more detail, the entire defects D may overlap the area A in the width direction of the electrode sheet 1.

As illustrated in FIG. 3a, when a length LD of the defect D with respect to the longitudinal direction (i.e., the movement direction) of the electrode sheet 1 is a predetermined length or more, a length LA of the area A may be equal to or similar to the length LD of the defect D. Preferably, the length LA of the area A may be slightly greater than the length LD of the defect D in consideration of a cutting tolerance and the like.

On the other hand, as illustrated in FIG. 3b, when the length LD of the defect D in the longitudinal direction (i.e., the movement direction) of the electrode sheet 1 is less than a preset length, the area A may have a preset minimum length $L_{A,min}$.

That is, the area A may have a predetermined minimum length $L_{A,min}$ regardless of the size of the defect D. Thus, the mark M formed on the area A may be easily identified in the future. In addition, in the process in which a portion of the non-coating portion 3 is processed to form the tab, it may prevent the mark M from being unrecognizable due to cutting of the entire area A.

The minimum length $L_{A,min}$ may vary depending on the length of the unit electrode formed by cutting the electrode sheet 1 or the tab formed on the unit electrode.

As described above, the marker 30 may discontinuously mark the ink on the area A as illustrated above. That is, the plurality of marks M may be formed at predetermined intervals in the longitudinal direction of the electrode sheet 1 within the area A. In addition, each of the marks M may have a predetermined width and length.

Thus, when compared to the case in which the marks M are continuously connected, the mark detection sensor (not shown) may count the number of marks M to easily detect the length of the area A, and then, each of the marks M may be dried more quickly.

Figure 4:
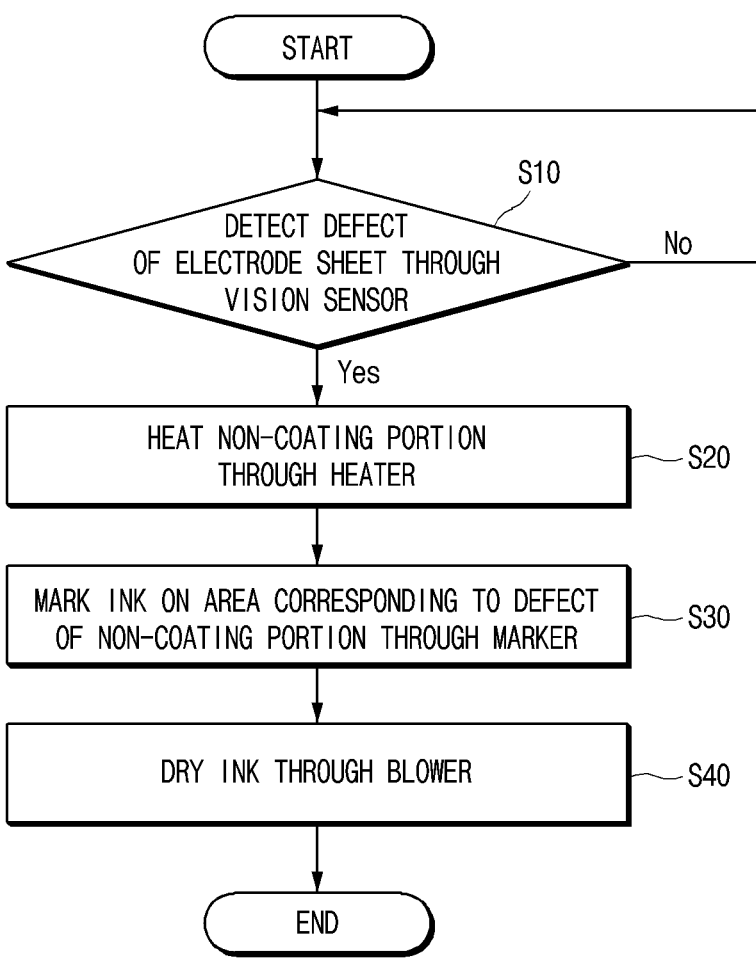
FIG. 4 is flowdiagram illustrating a marking method for identifying defects of an electrode sheet according to an embodiment of the present invention.

FIG. 4 is flow diagram illustrating a marking method for identifying defects of an electrode sheet according to an embodiment of the present invention.

The marking method for identifying defects of an electrode sheet (hereinafter, referred to as a 'marking method') according to an embodiment of the present invention may be performed by the above-described marking system.

In more detail, the marking method may include a detecting process (S10), a heating process (S20), a marking process (S30), and a drying process (S40).

The detecting process (S10) may be a process in which a vision sensor 10 detects defects D of an electrode sheet 1. In the detecting process (S10), the vision sensor 10 may detect the defects D disposed on the electrode sheet 1, more specifically the active material layer 2 in a non-contact manner, and information or signals including positions or sizes of the defects D may be transmitted to a controller 60. In addition, the controller 60 may calculate a position and length of an area A on which ink is marked on a non-coating portion 3 based on the information or the signals. The area A may be elongated corresponding to the length of the defect D with respect to a moving direction of the electrode sheet 1. However, the area A may have a predetermined minimum length $L_{A,min}$.

The heating process (S20) may be a process in which a heater 20 heats the non-coating portion 3 and may be performed when the defects D of the electrode sheet 1 are detected in the detecting process (S10). The heater 20 may previously heat the non-coating portion 3 before a marker 30 marks ink.

The controller 60 may communicate with an encoder 70 provided in a moving mechanism for moving the electrode sheet 1 to calculate a moving speed of the electrode sheet 1 and may control a heating temperature of a heater 20 based on the moving speed of the electrode sheet 1. That is, a temperature of the heater 20 may be proportional to the moving speed of the electrode sheet 1. In addition, the heater 20 may heat the non-coating portion 3 to 30 degrees to 100 degrees Celsius without lowering tensile strength of the non-coating portion 3 while drying of the ink is promoted.

Also, the controller 60 may control an operation time of the heater 20 according to the length of the area A. That is, the operation time of the heater 20 may be proportional to a length LA of the area A.

The marking process (S30) may be a process in which the marker 30 marks the ink on the area A of the heated non-coating portion 3. The controller 60 may control the marker 30 in response to the moving speed of the electrode sheet 1 to form a plurality of marks M on the area A. The plurality of marks M may be formed discontinuously by being spaced a predetermined interval from each other. Since a size of each of the marks M is constant, the number of plurality of marks M may vary according to the length LA of the area A. Since the area A has a minimum length $L_{A,min}$, the plurality of marks M may also have a minimum number.

The drying process (S40) may be a process in which a blower 40 injects air to the area A of the non-coating portion 3 to dry the ink, that is, the marks M. The blower 40 may be disposed between the marker 30 and a guide roll 50 so that the mark M formed on the non-coating portion 3 is transferred to the guide roll 50 and not erased.

The controller 60 may control a rotation speed of a fan included in the blower 40 based on the moving speed of the electrode sheet 1. That is, an output of the blower 40 may be proportional to the moving speed of the electrode sheet 1.

In addition, the controller 60 may control the operation time of the blower 40 according to the length of the area A. That is, the operation time of the blower 40 may be proportional to the length LA of the area A.

Thus, a mark M having high visibility may be formed on the electrode sheet 1 passing through the marking system. In the future, a portion of the electrode sheet 1 in which the mark M is detected, or a unit electrode will be discarded or collected.

Figure 5:
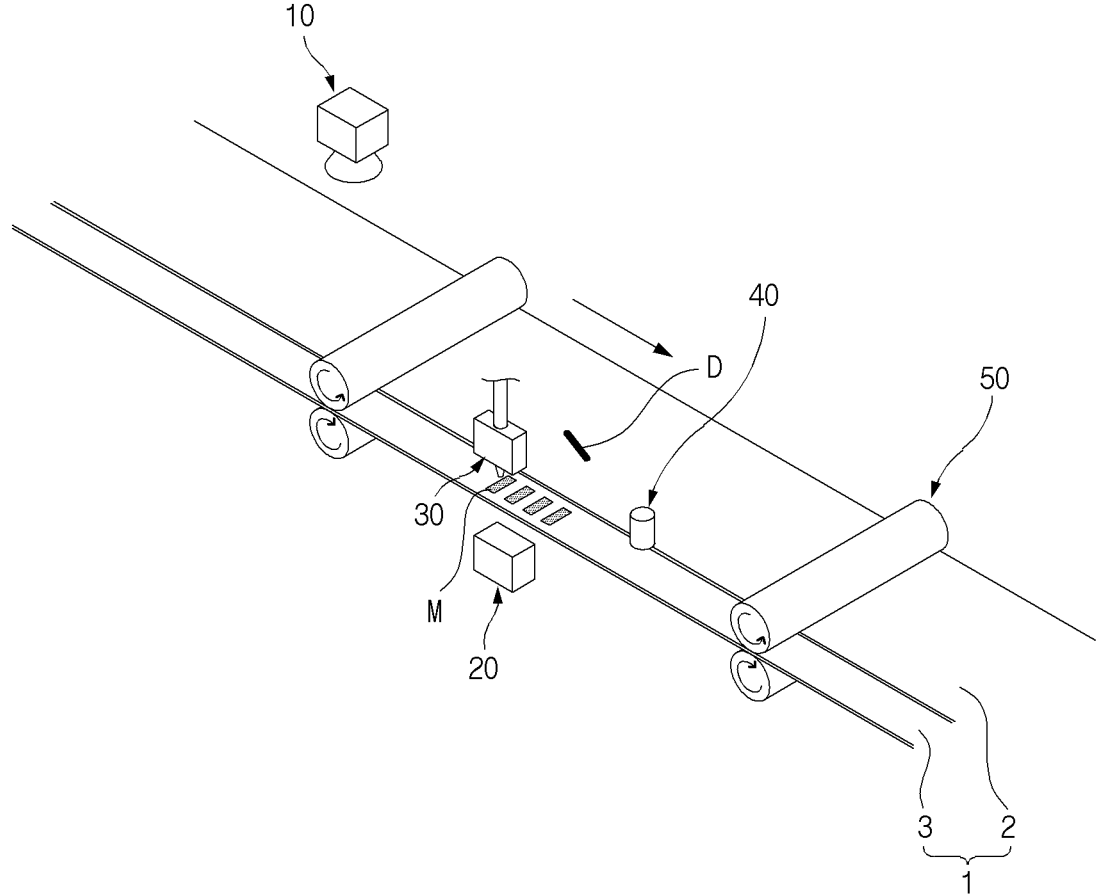
FIG. 5. is a perspective view illustrating a marking system for identifying defects of an electrode sheet according to another embodiment of the present invention.

FIG. 5 is a perspective view illustrating a marking method for identifying defects of an electrode sheet according to another embodiment of the present invention.

In case of this embodiment, since this embodiment is the same as the foregoing embodiment except for an arrangement of a heater 20, duplicated contents will be omitted, and differences will be mainly described.

The heater 20 and a marker 30 of this embodiment may be disposed to face opposite sides with respect to a non-coating portion 3. In more detail, the marker 30 may face a top surface of the non-coating portion 3 to mark ink on the top surface of the non-coating portion 3, and the heater 20 may face a bottom surface of the non-coating portion 3.

Also, the heater 20 may be disposed to face the marker 30 with the non-coating portion 3 therebetween. However, it is also possible that the heater 20 is disposed just in front of the marker 30 with respect to the moving direction of the electrode sheet 1.

Due to this arrangement, a space required for installing the heater 20, the marker 30, and the blower 40 may be reduced. In addition, as described above, it is preferable that a guide roll 50 is not disposed between the heater 20, the marker 30, and the blower 40. Therefore, even if a distance between the pair of guide rolls 50, which are adjacent to each other, with respect to a moving direction of the electrode sheet 1 is short, the heater 20, the marker 30 and the blower 40 may be disposed between the pair of guide rolls 50. Therefore, there is an advantage in that the marking system is easy to be applied to an existing equipment.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present invention is to be considered illustrative, and not restrictive, and the technical spirit of the present invention is not limited to the foregoing embodiment.

Therefore, the scope of the present disclosure is defined not by the detailed description of the invention but by the appended claims, and all differences within the scope will be construed as being included in the present disclosure.

DESCRIPTION OF THE SYMBOLS

1: Electrode sheet 2: Active material layer
3: Non-coating portion 10: Vision sensor
20: Heater 30: Marker
40: Blower 50: Guide roll
60: Controller A: Area (on which ink is marked on non-coating portion)
D: Defect M: Mark

The invention claimed is:

1. A marking system for identifying defects of an electrode sheet including an active material layer coated with an electrode active material and a non-coating portion disposed at one side in a width direction of the active material layer, the marking system comprising:

a vision sensor configured to detect the defects of the electrode sheet;

a heater disposed behind the vision sensor in a moving direction of the electrode sheet, the heater being configured to heat the non-coating portion when the defects are detected by the vision sensor;

a marker configured to mark ink on an area corresponding to each of the defects on the non-coating portion heated by the heater; and a blower disposed behind the marker in the moving direction of the electrode sheet to dry the ink on the area.

2. The marking system of claim 1, further comprising at least one guide roll that is in contact with the electrode sheet to guide movement of the electrode sheet, wherein the guide roll is not disposed between the marker and the blower in the moving direction of the electrode sheet.

3. The marking system of claim 1, wherein the heater is disposed in front of the marker in the moving direction of the electrode sheet.

4. The marking system of claim 1, wherein the marker and the heater are disposed to face the same surface of the non-coating portion.

5. The marking system of claim 1, wherein the heater comprises a heating source that is not in contact with the non-coating portion.

6. The marking system of claim 1, further comprising a controller configured to control either the heater or the blower or both based on any one of a moving speed of the electrode sheet or a length of the area.

7. A marking method for identifying defects of an electrode sheet including an active material layer coated with an electrode active material and a non-coating portion disposed at one side in a width direction of the active material layer, the marking method comprising:

a detecting process of detecting the defects of the electrode sheet through a vision sensor;

a heating process of heating the non-coating portion through a heater when the defects are detected;

a marking process of marking ink through a marker on an area corresponding to each of the defects on the heated non-coating portion; and a drying process of injecting air to the area through a blower to dry the ink.

8. The marking method of claim 7, wherein the area has a predetermined minimum length.

9. The marking method of claim 7, wherein, in the heating process, a temperature of the heater is proportional to a moving speed of the electrode sheet, and an operation time of the heater is proportional to a length of the area.

10. The marking method of claim 7, wherein, in the drying process, an output of the blower is proportional to a moving speed of the electrode sheet, and an operation time of the blower is proportional to a length of the area.

11. The marking method of claim 7, wherein, in the marking process, the ink is marked discontinuously on the area.

12. The marking method claim of 7, wherein, in the heating process, the heater heats the non-coating portion at a temperature of 30 degrees to 100 degrees Celsius.

13. The marking system of claim 1, wherein the heater is disposed to face the marker with the non-coating portion therebetween.

* * * * *